US006941557B1

(12) United States Patent
Jakobson et al.

(10) Patent No.: US 6,941,557 B1
(45) Date of Patent: Sep. 6, 2005

(54) SYSTEM AND METHOD FOR PROVIDING A GLOBAL REAL-TIME ADVANCED CORRELATION ENVIRONMENT ARCHITECTURE

(75) Inventors: Gabriel Jakobson, Brookline, MA (US); Leonhard Brenner, Natick, MA (US); Carol Lafond, Lincoln, NH (US); Mark Weissman, Framingham, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/577,071

(22) Filed: May 23, 2000

(51) Int. Cl.[7] .............................................. G06F 9/46
(52) U.S. Cl. ....................... 719/316; 719/318; 709/223; 709/224
(58) Field of Search ................................ 709/318, 316, 709/224, 223; 719/316, 318

(56) References Cited

U.S. PATENT DOCUMENTS

| | | | |
|---|---|---|---|
| 5,063,523 A | 11/1991 | Vrenjak | |
| 5,193,152 A | 3/1993 | Smith | |
| 5,257,371 A | 10/1993 | Anezaki | |
| 5,276,880 A | 1/1994 | Platoff et al. | |
| 5,339,421 A | 8/1994 | Housel, III | |
| 5,388,189 A | 2/1995 | Kung | |
| 5,488,569 A | 1/1996 | Kaplan et al. | |
| 5,495,470 A | 2/1996 | Tyburski et al. | |
| 5,715,394 A | 2/1998 | Jabs | |
| 5,721,825 A * | 2/1998 | Lawson et al. | 709/203 |
| 5,751,914 A | 5/1998 | Coley et al. | |
| 5,761,502 A * | 6/1998 | Jacobs | 707/103 R |
| 5,805,808 A | 9/1998 | Hasani et al. | |
| 5,832,228 A | 11/1998 | Holden et al. | |
| 5,925,108 A | 7/1999 | Johnson et al. | |
| 5,953,404 A | 9/1999 | Fikis et al. | |
| 6,118,936 A * | 9/2000 | Lauer et al. | 709/224 |
| 6,336,139 B1 * | 1/2002 | Feridun et al. | 709/224 |
| 6,446,136 B1 * | 9/2002 | Pohlmann et al. | 709/318 |
| 6,477,585 B1 * | 11/2002 | Cohen et al. | 709/318 |

OTHER PUBLICATIONS

Brenner et al., "Grace—Global Real—Time Advanced Correlation Environment," Version 1.2, (1999).
Goyal et al., "Cellular Network Management: Need and Evolution of Intelligent Integrated Systems," GTE Laboratories, 355-363.
IMPACT, User's Guide, GTE Laboratories.

(Continued)

Primary Examiner—Meng-Al T. An
Assistant Examiner—Li Zhen
(74) Attorney, Agent, or Firm—Finnegan, Henderson, Farabow at el.

(57) ABSTRACT

A method and system are disclosed for efficiently correlating network events within a data processing system and then transmitting messages to various network entities in response to an occurrence of a particular network event. According to the present invention, a network mediation service receives raw message streams from one or more external networks and passes the streams in real-time to the event notification service. The event notification service then passes the message to the message parsing service for processing. After the message has been parsed by the message parsing service, it is passed back to the event notification service which passes the message along an event channel to the network management service. The message is also passed to the event correlation service for event correlation. A knowledge-based database of message classes that define how to interpret the message text are used by the event correlation service to match correlation rule conditions to the observed events. After event correlation service processes the parsed event, it is passed to the network management service for resolution.

15 Claims, 10 Drawing Sheets

OTHER PUBLICATIONS

Jakobson et al., "Knowledge-Based GUI for Network Surveillance and Fault Analysis," 0-7803-1811-0/94, 846-855, IEEE (1994).

Jakobson et al., "Cellular Network Capacity Planning Using Dependency-Based Data Modeling," 0-7803-4351-4/98, 706-712, IEEE (1998).

Jakobson et al., "Alarm Correlation—Correlating multiple network alarms improves telecommunications network surveillance and fault management," 0890-8044/93, 52-58, IEEE (1993).

Kerschberg et al., "Intelligent Network Management: A Heterogenous Knowledge Source Approach," 90CH2930-6/90/0000-0314, 314-316, IEEE (1990).

* cited by examiner

EVENT CORRELATION CLASSES

| | | | | |
|---|---|---|---|---|
| 1. | COMPRESSION | [a, a....., a] | → | a |
| 2. | FILTERING | [a, p(a) < H] | → | ∅ |
| 3. | SUPPRESSION | [a, C] | → | ∅ |
| 4. | COUNT | [n x a] | → | b |
| 5. | ESCALATION | [n x a, p(a)] | → | a, p'(a), p' > p |
| 6. | GENERALIZATION | [a, a *SUBSET* b] | → | b |
| 7. | SPECIALIZATION | [a, a *SUPERSET* b] | → | b |
| 8. | TEMPORAL RELATION | [a T b] | → | c |
| 9. | CLUSTERING | [a, b, ...T, *AND, OR NOT*] | → | c |

KEY

| | |
|---|---|
| a, b, c | EVENTS |
| ∅ | EMPTY (NO EVENT) |
| c | CONTEXTUAL INFORMATION |
| n | INTEGER |
| p(a) | PARAMETER OF EVENT A |
| H | THRESHOLD |
| T | TEMPORAL RELATION |
| and, or, not | LOGICAL OPERATORS |
| X | MULTIPLICATION |
| < | LESS |
| > | MORE |

FIG. 1

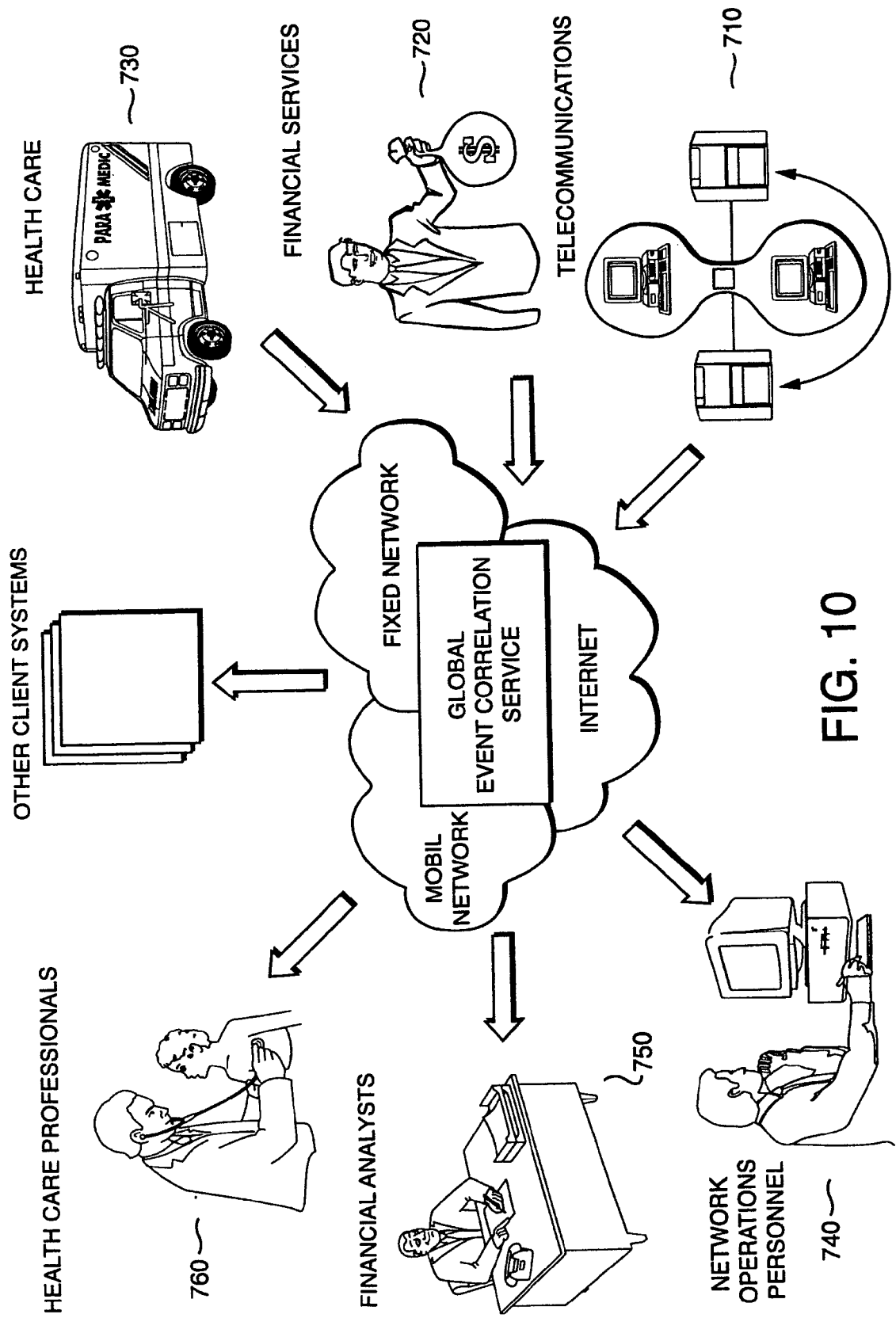

SYSTEM AND METHOD FOR PROVIDING A GLOBAL REAL-TIME ADVANCED CORRELATION ENVIRONMENT ARCHITECTURE

RELATED APPLICATIONS

Related patent applications filed on May 23, 2000 include UNIFIED MESSAGE PARSER APPARATUS AND SYSTEM FOR A REAL-TIME EVENT CORRELATION, Ser. No. 09/576,296; SYSTEM AND METHOD FOR PROVIDING AN INTERNET-BASED CORRELATION SERVICE, Ser. No. 09/577,035; and SYSTEM AND METHOD FOR PROVIDING ADVANCED EVENT CORRELATION, Ser. No. 09/577,070.

FIELD OF THE INVENTION

The present invention relates to distributed event management in telecommunication and data networks, and more particularly to the use of knowledge-based and distributed systems technologies for performing event correlation and notification for network fault, performance and test management.

DESCRIPTION OF THE RELATED ART

Since the first computer network came "online" there have been network problems, disorders and anomalies that periodically occur in the network hardware, software, or both. They are sometimes spurious, transient, redundant, time correlated, or too numerous to be handled at the same time. Given the size and dynamic nature of modern telecommunication and data networks, it is no wonder that the task of identifying network problems continues to baffle software engineers the world over. Exacerbating the problem is the reality that a single fault may sometimes result from a hardware problem and other times from a software problem. With the explosive growth in the size and complexity of networks, it is also not uncommon for a burst of alarms during a major network failure to reach 100, 200 and more alarms per second. Under these conditions, systems personnel of all experience levels confront an inability to follow the stream of incoming events, often leading to alarms being noticed too late, or not at all. When the alarms are eventually noticed, all too often corrective measures are determined based on a single alarm or on incomplete subset of the active alarms, potentially complicating the already onerous situation.

Such delays can be costly in large networks, which are heavily relied upon to quickly move vast amounts of data in short periods of time to carry out the normal course of business. For example, large financial institutions rely upon such systems to reflect the transfer of large sums of money electronically. Loss of that ability even for a relatively short period of time may be very costly to the institution and its clients. Similarly, airlines rely upon such systems to track passenger reservations. Loss of that ability can result in flight delays or cancellations and loss of customers.

In an effort to assist network management personnel in resolving these problems, a variety of network management systems to monitor network operations have been developed. These systems were generally capable of performing network surveillance and monitoring functions, and is some cases they were able to diagnose simple network faults.

As the size and complexity of networks grew, it became clear that the traditional network management systems could no longer simply report problems, and instead required intelligent analysis and diagnostic capabilities in order to be effective. Such a system must monitor network events, associate related events with each other, infer possible root causes of events, determine the impact of events on network traffic, present the current state of the network, and recommend appropriate actions. In other words, the network management systems must exhibit some level of intelligence in analyzing the incoming events, understanding the surrounding management context, testing connectivity between network elements, identifying patterns in the stream of events, and suggesting corrective actions. The systems should be able to explain their actions, learn from their past behavior, and present the results in a form easily comprehendible by the network management personnel. To a very large extent, many of the functions listed above are based on a fundamental capability of real-time event correlation. Formally, event correlation is a conceptual interpretation procedure that assigns new meaning to a set of events. Algorithmically, event correlation is a dynamic pattern matching process over a stream of events. These events may include: raw events, status and clear messages from network elements (NEs); events from mediation devices, subnetwork management systems, test systems, environmental sensors and other equipment; user action messages from network operator terminals; and system interrupts. In addition to the real-time events, the correlation patterns may include network topology information (e.g. network connectivity), diagnostic test data, data from external databases, and other ancillary information. Event correlation enables several event management tasks, including: (1) reducing information load by dynamic focus monitoring and context-sensitive event suppression and filtering; (2) increasing the semantic content of information through generalization of events; (3) fusion of information from multiple sources; (4) real-time fault detection, causal fault diagnosis, and suggestion of corrective actions; (5) ramification analysis of events and prediction of system behavior; and (6) long-term trending of historic events.

Real-time event correlation has been used for well over a decade with applications in various fields, not the least of which is network management. Today, event correlation has become one of the most critical functions for managing the high volume of event messages. Practically speaking, no network management system can effectively conduct network surveillance and control procedures without some form of event correlation. In fact, event correlation has become so instrumental in identifying obscure network problems that network management software developers have begun to broaden the utility of event correlation to other aspects of network management, such as performance configuration, testing, security, and service quality management.

An event, in the context of event correlation reflects a change in the state of an object, system or process. System internal events, e.g. failures, may be manifested by associated external events—alarms. However, in very many cases internal failures are not signaled by any alarms at all. The situation of an opposite phenomena arises with too many alarms, generated by cascaded network element failures caused by a single root failure. In this situation appropriate alarm correlation and filtering methods should be applied in order to detect the root cause of the "alarm storm". Event correlation is the process of observing a series of events that occur over a period of time and then interpreting the events.

The act of interpreting the events ranges from a simple task of event compression to a complex pattern-matching operation.

A more detailed discussion of the specific classes of event correlation will now be provided with reference to FIG. 1. As shown in FIG. 1, the classes of event correlation include: compression, filtering, suppression, count, escalation, generalization, specialization, temporal relation, and clustering. Event compression is the task of reducing multiple occurrences of identical events into a single representation of the events. No number of occurrences of the event is taken into account. The meaning of the compression correlation is almost identical to the single event "a," except that additional contextual information is assigned to the event to indicate that this event happened more than once.

Event filtering provides that if parameter, p(a) (e.g., priority, type, etc.) of alarm "a" does not fall into the set of predefined values H then alarm a is discarded or sent into a log file. In more sophisticated cases, the value of H could be dynamic and depend on a user-specified criteria or a criteria calculated by the system.

Event suppression is a context-sensitive process in which event "a" is temporarily inhibited depending on the dynamic operational context C of the network. The context C is determined by the presence of other event(s), network management resources, management priorities, or other external requirements. A change in C could later lead to the future reporting of the suppressed event. Temporary suppression of multiple events and the control of the order of their exhibition are two techniques for dynamic focus monitoring of the network management process.

Count is the process of counting and thresholding the number of repeated arrivals of identical events. Event escalation assigns a higher value to a parameter, p'(a) (usually the priority) of event a, depending on the operational context, e.g., the number of occurrences of event a in a given period of time or the number of occurrences of event a while event b is not also occurring.

Event generalization is a correlation in which event a is replaced by its super class b. Event generalization has a potentially high utility for network management because it allows a system manager to change from a low-level perspective of network events and view situations from a higher level.

Event specialization is the opposite of event generalization. It substitutes an event with a more specific subclass of the event.

Temporal relations (T) between events a and b allow them to be correlated depending on the order and time of their arrival.

Finally, event clustering allows the creation of complex correlation patterns using logical and, or, and not operators.

One approach for correlating events in complex systems is to implement a rule-based expert system to monitor event flow. Rule-based expert systems generally contain two components: (1) a working memory which represents knowledge of the current state of the system being monitored; and (2) a rule base which contains expert knowledge in the form of "condition-action" rules, also known as "if-then" rules. The condition part of each rule determines whether the rule can be applied based on the current state of the working memory. It contains relations that are applied to objects or groups of object slots or tests. Within the object slots we can apply math expressions and use arithmetic relations (greater than '>,' less than '<,' equal to '=,' greater than or equal to '>=,' less than or equal to '<=' and not equal to '!='). The action part of a rule contains executable commands, such as: (1) assert—creates a new correlation; (2) support—adds support for an existing correlation; (3) clear—kills the correlation and removes it from consideration; (4) load—requests data from a source; and (5) modify—change state or other slot values. In other words, the condition part of each rule determines whether (or "if") the rule can be applied based on the current state of the working memory; and the action part of a rule contains a conclusion ("then") which can be drawn from the rule when the condition is satisfied. A rule either recognizes some event or combination of events, or performs some correlation management function. Thus, a rule may assert, resolve, or close some other correlations. It may load a portion of the network or modify the state of a working memory network element. Creating a correlation may invoke some defined function or script or send a notification to external systems.

Event correlation systems accordingly require a sophisticated event notification method that provides an adaptable, smooth flowing reporting mechanism. These systems must also enable network management personnel to quickly analyze problems and then determine the optimal solution for restoring data flow.

One drawback of conventional event correlation systems relates to the heterogeneous nature of the networks on which they operate. Multiple protocols, data formats and transmission mediums make the identification, correlation and notification of events to geographically dispersed network elements extremely troublesome even for the most robust systems.

Another drawback of the current event correlation systems is the fact that most event correlation capabilities exist as "post factum" solutions. That is, they are either built-in extensions to existing management systems, or as stand-alone external systems with weak integration, cooperation and resource sharing between other components of the network management software.

SUMMARY OF THE INVENTION

Overcoming these drawbacks requires a network management system to perform several functions including: monitor network events, associate related events with each other, infer possible root causes of faults, determine the impact of events in terms of customer traffic, present the current state of the network to various network entities, and recommend appropriate actions in a minimum time. Overcoming the current drawbacks also requires that the developed event correlation systems operate as an integral part of next-generation network management systems, as opposed to afterthought add-ons.

Systems and methods consistent with this invention create a global real-time advanced correlation environment (GRACE) that provides real-time event correlation, explanation and notification capabilities in a network management environment. GRACE is a knowledge-based event correlation system for efficiently correlating a plurality of network events and then transmitting correlated (derived) messages to various network management entities in response to an occurrence of a particular network event. The GRACE system is comprised of multiple distributed services, which are communicating via a uniform CORBA interface. The services are divided into real-time event management services and interactive knowledge/data management services. This division in the GRACE system architecture supports the need to provide fast channels for real-time event processing, while making interactive services available on an on-call basis, to provide required knowledge, models, procedures and data in support of the real-time processes.

In a preferred embodiment, the real-time services include: Network Mediation, Message Parsing, Event Correlation, and Event Notification Services. The interactive services include: Network Topology and Database Services.

The Mediation Service provides connectivity to the elements of the managed networks, such as switches, digital cross-connects, routers, etc. The incoming raw events (messages) are parsed by the Parsing Service. The Correlation Service performs the functions of real-time event pattern matching, processes event objects, topology and other data, and executes predetermined actions as described by the correlation rules.

The Event Notification Service plays a special role in the architecture by facilitating communication between the real-time components of the architecture. It enables sophisticated event passing interfaces between distributed objects—the producers and consumers of events. The interfaces are mediated via event channels that allow decoupling of producers and consumers in the sense that they possess no knowledge about each other. The CORBA standard for the Notification Service, the OMG's COSNotification Service defines several important features of the Notification Service, including asynchrony, event subscription, multicast event routing, event filtering, quality of service, and structured events. The output of one channel can be chained to the inputs of another channel to create a notification chain. Each of the nodes in a notification chain may cache events, take actions, perform some transformation on the events, and forward them along the chain. Services may in turn, select relevant events via filters. It becomes easier to replace these chained services with newer or alternate versions because the interaction is decoupled. It is easy to add supporting functions such as validation by creating a service and having it subscribe to a pre-existing channel.

One of the most fundamental changes in the architecture of telecommunication and data network management systems is the move from embedded, monolithic, and loosely coupled architectures toward distributed, open, component-based architectures. The use of standard services (components) with well-defined functionality and standard inter-component communication protocols allows the building of open, scalable, and customizable systems. The encapsulation of the idiosyncrasies of components and easy addition, replication, and replacement of components provides an effective environment for developing, multi-paradigm, fault-tolerant, and high-performance systems. Various middleware technologies can be used for building the infrastructure of distributed network event management systems, including CORBA, DCOM, and Java RMI. While this specification describes the system as implementing the CORBA technology, it is important to note that the principles of component-based services proposed herein will be true for other middleware implementations.

The basic framework for component-based service is envisioned as a multilevel hierarchy of services, where services at a higher level are built from component services. As shown in FIG. 2, the present invention utilizes five levels of these systems: system, domain, application, customer and integrated services.

The System Services include the set of services, which define basic functions to identify objects, to store and retrieve them, and to define relations and processes between them. Examples of the nature of these services are CORBA system services, such as COSNaming, COSEvent, COSNotification, COSProperty, COSLog and others. In addition, the System Level Services might include scripting services, e.g., Tcl, Perl, and Java scripting services. The System Services form the core set of distributed services that are used for building the next level of Domain Services.

The Domain Services layer contains services, whose functionality and implementation are oriented toward specific domain tasks. Some of the most frequently used Domain Services include Event Interpretation, Event Correlation, Configuration (Topology), OLAP (On-Line Analytical Processing), Data Visualization, and Data Mediation Services.

Application Level Services are significant operational components built from the Domain Level Services. They perform (system, network and service) surveillance, alarm and fault management, quality of service (QoS) management, billing, and other application oriented functions.

Customer Level Services include a functionally complete set of services set of services, which have value from a customer perspective. Integrated Services are packages combined from the Customers Level Services.

The general event correlation/management system architecture is built upon distributed services (components) discussed above. In the preferred embodiment of the subject invention, the following generic features of the architecture have been implemented: (1) encapsulation of implementation idiosyncrasies of the different components; (2) the use of a standard event specifications and event passing protocols; and (3) adoptation of a common knowledge/data transportation format (XML).

These features permits one to build customized management systems of different functionality, scale, and complexity. Different instances of the domain level services can be used, as long as they all satisfy overall functional and data semantic constraints. For performance or functional reasons, multiple processes of the same service could be launched. For example, a hierarchy of event correlation processes could be created. This hierarchy could be used to implement a multilevel system management paradigm, e.g., to implement local and global correlation functions.

In accordance with one aspect of the present invention, users are permitted to define correlation rules graphically as finite state machines (FSM). This is particularly useful in situations where the entire problem set naturally lends itself to a finite state representation. Each FSM has a finite number of states and changes from one state to another when an input or stimulus is applied to the machine. A state is defined as a stable condition in which the entity or FSM rests until the next stimulus or input is applied. Each input also causes the FSM to generate an observable output. In this case, FSMs are manifested by a set of state values associated with a given NE slot and a set of transitions and associated patterns for moving between these states. FSMs may be implemented as multiple rules but managed as a single object. Rule condition patterns will be associated with transitions between states. These rules may not be directly visible to the user, and they will typically indicate the current state as the first condition and the desired goal state as the action. New messages, timeouts, or other asynchronous events may drive the state machine to other states. The states of a specific state machine will be stored as a slot value of a NE. Different state machines may exist for a given NE but will use different state slots. Because the values of these state slots will be visible outside of the state machine, it is possible to implement nested machines or a machine driven by the states of multiple NEs or state machines. It is also possible with the existing network model to define a NE which only contains global states. The NE class describes the NE types that exist in the domain, and are used to describe the actual NEs.

In accordance with another aspect of the present invention, users are permitted to establish rule sets which are collections of rules, FSMs and other rule sets. This allows named subsets of the global knowledge base to be created. Rule sets may be assigned priorities that may be used to prefer rules in a specialized set over those in a default set. Rule sets may also contain other meta information such as creator, modification date, textual description, etc. Consistency checks may be performed for a rule set to insure compatibility between selected rules.

In accordance with yet another aspect of the present invention, event correlation methodologies are applied to the task of information management on the Internet. Provided as an Internet-based service to any client, information correlation procedures will perform a variety of functions, e.g. stock market information correlation, home security information correlation, and health care information correlation. More specifically, real-time correlation of different stock market information sources over the Internet could potentially transform novice stock market enthusiasts into experienced Wall Street analysts. Any client or day trader using an Internet browser could specify sources, select (customize) correlation methods and define the mode of correlation delivery (Internet, pager, phone, etc.) The stock market information correlation system would then take care of the rest. As another example, data could be collected from emergency care patients or outpatients using attached data sensors. The data would be correlated into more meaningful indicators and warning signs for delivery to doctors or to other health care professionals.

Additional objectives, features and advantages of the invention are set forth in the following description, apparent from the description, or may be learned by practicing the invention. Both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings:

FIG. 1 is a listing and description of classes of event correlations;

FIG. 10 is a graphical representation of the plurality of different applications that are supported by the preferred embodiment of the present system.

DETAILED DESCRIPTION OF THE PREFERRED EMBODIMENTS

In the following detailed description of the preferred embodiment, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, riot to be taken in a limited sense.

A system in accordance with the present invention comprises a message parsing service, a network management service, an event notification service, a network mediation service, and an event correlation service. In operation, the event notification service receives an unparsed message or event from the network mediation service and then passes the message to the message parsing service for processing. After the message has been parsed by the message parsing service, it is passed back to the event notification service, which passes the message along an event channel to the network management service. The message is also passed to the event correlation service for event correlation. A knowledge-based database of message classes that define how to interpret the message text are used by the event correlation service to match correlation rule conditions to the observed events. After event correlation service processes the parsed event, it is passed to the network management service for resolution.

Figure 2:
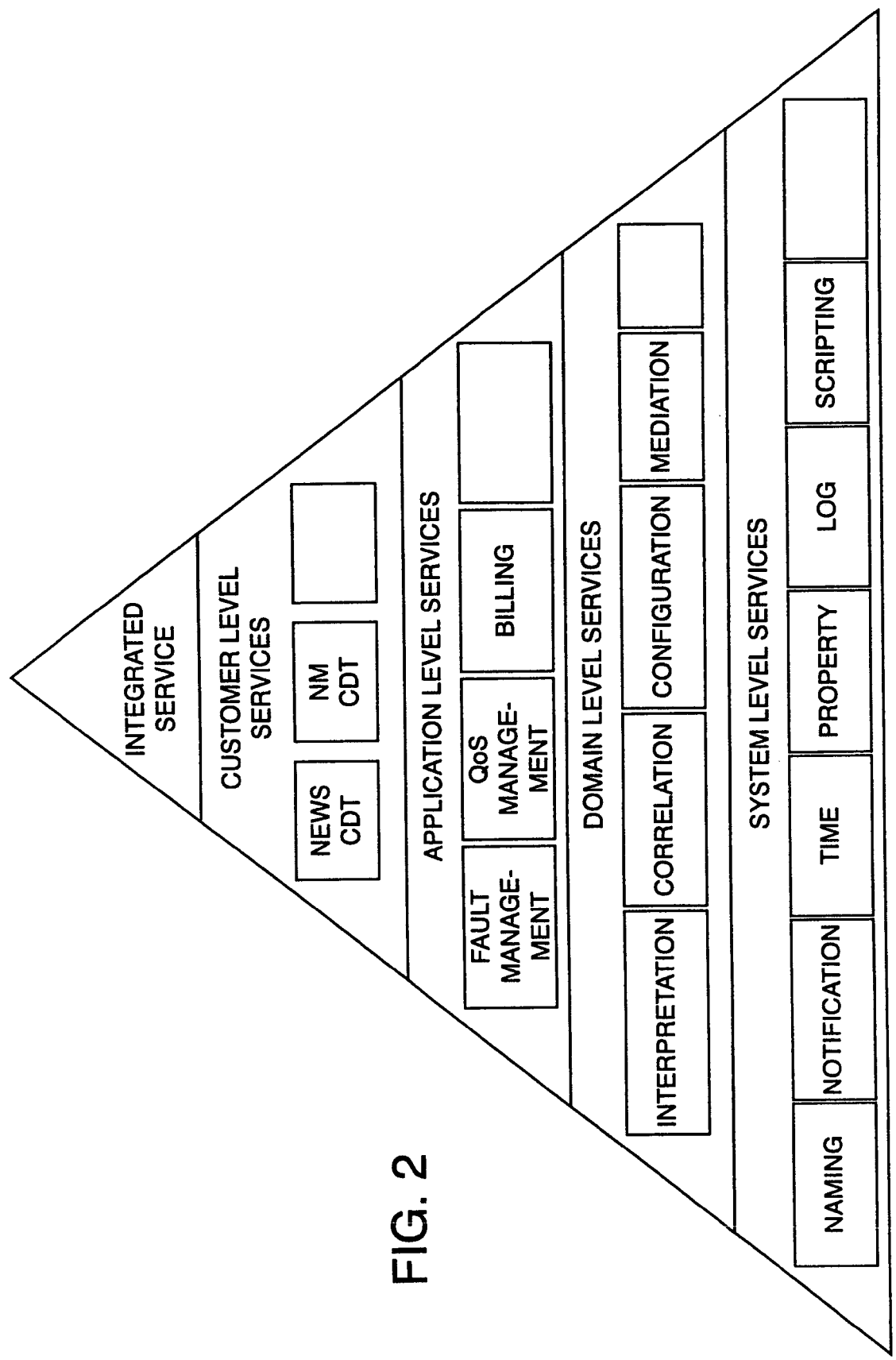
FIG. 2 is a multilevel diagram of the hierarchy of services.
Figure 3:
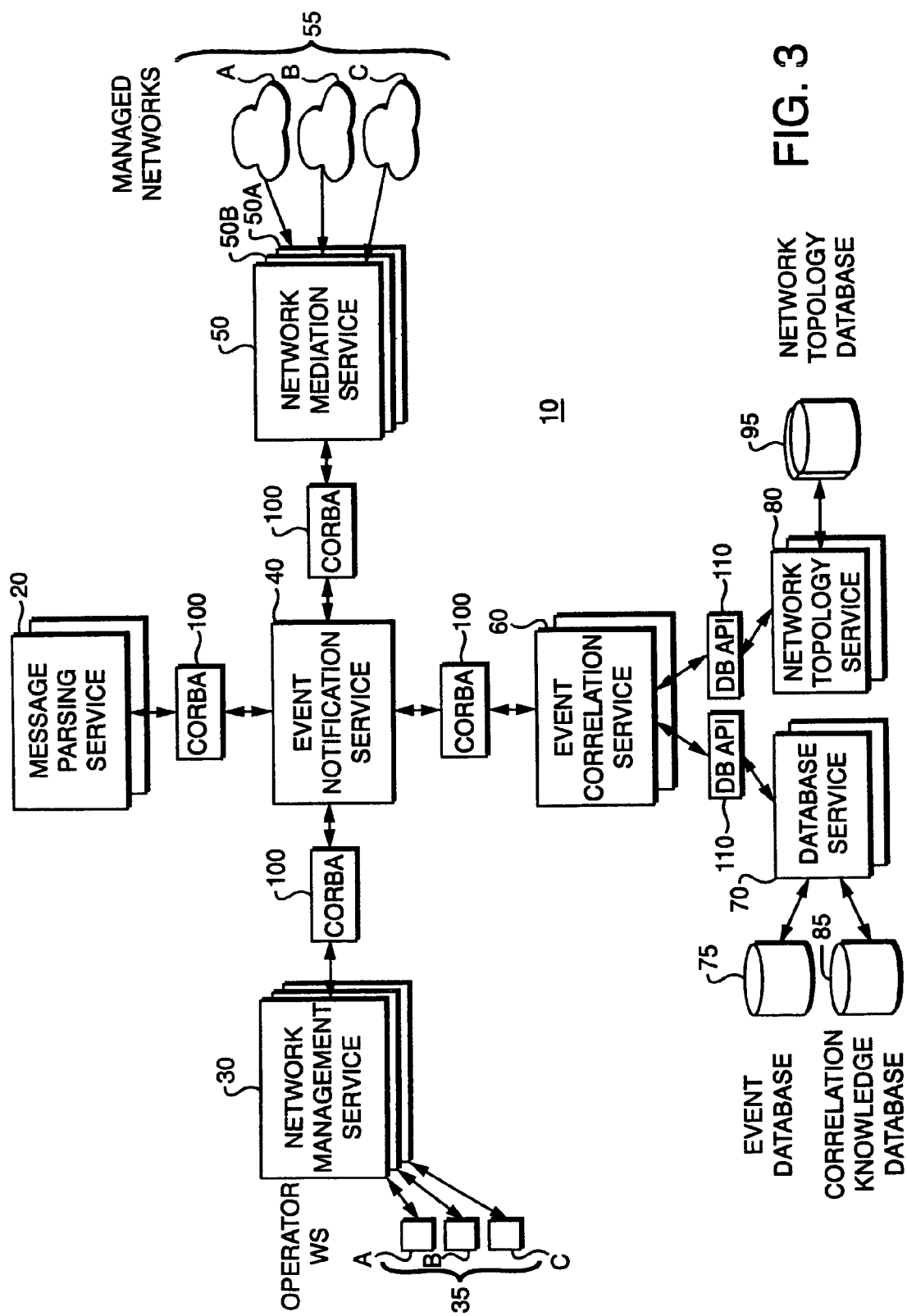
FIG. 3 is a diagram illustrating a global real-time advanced correlation environment (GRACE) in accordance with a preferred embodiment of the present invention.

One of the many distributed services suited for use with the present invention is shown generally at 10 in FIG. 3. As illustrated, network correlation system 10 is comprised of a plurality of interconnected computers and microprocessors hosting a plurality of operating systems. Network correlation system 10 provides a real-time event correlation service for a broad variety of network management operations. In a preferred embodiment, correlation system 10 is a network of inter-operating software services, which perform specific well-defined functions (e.g., processing events, and passing events to each other along event channels provided by the notification service.) The notification service acts as general "plumbing" mechanism between the services. The connections to the channels of the notification service is implemented via a subscription mechanism, where each service acts as a consumer and/or producer of events. The services in turn may be comprised of component services communicating in the similar manner. Connected to network correlation system 10 is a plurality of managed networks (MNs) 55a–c and operator workstations 35a–c.

Operating on at least one computer connected to network correlation system 10 are a plurality of services including: a message parsing service 20, a network management service 30, an event notification service 40, a network mediation service 50, an event correlation service 60, a database service 70, and a network topology service 80.

As shown in FIG. 3, message parsing service 20, network management service 30, network mediation service 50, and event correlation service 60 are coupled to event notification service 40 via a Common Object Request Broker Architecture (CORBA) interface 100. This design allows for efficient communication of real-time events between multiple event clients and servers. While communication interfaces described herein are CORBA interfaces, it is well known in the art that various other technologies such as the Distributed Component Object Model (DCOM) or Remote Method Invocation (RMI). Here, CORBA interface 100 provides a mechanism by which objects, applications or services can make requests to, and receive responses from other objects managed by network correlation system 10. In operation, a client service passes an object reference identifying the desired object operation along with any required parameters to CORBA interface 100. After receiving the object operation request from the client service, CORBA interface 100 uses the object reference to activate executable code which causes the desired operation to be performed. The results are passed back to CORBA interface 100, which passes them to the client service, completing the object operation sequence.

In a preferred embodiment, all events processed by network correlation system 10 are Common Object Source Notification (CosNotification) structured events. CosNotification is a CORBA implementation that provides distributed object event distribution. The present embodiment may also utilize the extensible Markup Language (XML) to provide an extended protocol for efficiently encapsulating application data and transporting it to another location. XML is purported to be the next generation markup language for the Internet. Consequently, XML data may be transmitted over CORBA in several ways. In a preferred embodiment, XML data is passed as a CORBA string. In essence, nested XML structures may be mapped directly into CORBA structures and CORBA structures may be mapped directly into XML strings. This approach allows clients and servers to benefit from the advantages of XML, while simultaneously relieving clients and servers from requiring XML parsers if they support CORBA.

In this description, a "service" is a software process that performs a specific function. A service may provide instantaneous "real time" support, or it may provide interactive support. However, in a preferred embodiment, message parsing service 20, network management 30, network mediation 50, and event correlation service 60 are real time services while database 70 and network topology services 80 are interactive services. Those skilled in the art will appreciate the fact that any combination of services can be real time or interactive, and that each service can be hosted on one or a plurality of computer workstations. A service that originates an event is an event supplier and a service that receives an event is an event consumer. In the present invention, suppliers and consumers are completely decoupled. In other words, a supplier has no knowledge of the number of consumers or their identities and consumers have no knowledge of the supplier that generated a given event. To support this model, CORBA uses an architectural element called an event channel. An event channel mediates the transfer of events between the suppliers and consumers as follows: (1) the event channel allows consumers to register for events, and stores this registration information; (2) the channel accepts incoming events from suppliers; and (3) the channel forwards supplier-generated events to registered consumers. Suppliers and consumers connect to the event channel and not directly to each other. From a supplier's perspective, the event channel appears as a single consumer; from a consumer's perspective, the channel appears as a single supplier. Any number of suppliers can issue events to any number of consumers using a single event channel. New suppliers and consumers can be easily added to the system, and they can connect to more than one event channel. As shown in FIG. 3, managed networks 55a–c communicate with network mediation service 50 across one of three separate event channels of network mediation service 50. That is, MN 55a communicates across network mediation service 50a, MN 55b communicates across network mediation service 50b, and so on. Operator workstations 35a–c are similarly coupled to separate event channels of network management service 30.

Database service 70 and network topology service 80 are coupled to event correlation service 60 via a database application program interface (DB API) 110. For example, the open database connectivity (ODBC) driver, developed by Microsoft Corporation of Redmond, Wash., is one such API that interfaces object-oriented application programs and relational databases. The Java™ database connectivity (JDBC™) driver, developed by Sun Microsystems of Mountain View, Calif., is another API used in a Java environment to interface object-oriented Java application programs and relational databases. While ODBC and JDBC are discussed above, those skilled in the art are aware that any comparable database access interefaces can be similarly used. Database service 70 provides a general service for data storage and retrieval, and network topology service 80 provides network topology (network element, network connectivity, containment) modeling and repository functions. The NE classes and instances are retrieved from the network topology service 80 and a virtual network model is created from those instances. Loaded portions of the network will be kept in memory at least as long as they are referenced by messages and correlations. This method fulfills two functions. First, it serves as a secondary source of network structure when the information is not available from network topology service 80. Second, it can also create virtual instances needed by network correlation system 10, but not supported by network topology service 80.

Network correlation system 10 also includes an event database 75, a correlation knowledge database 85, and a network topology database 95. Event database 75 and correlation knowledge database 85 are coupled to database service 70, while network topology database 95 is coupled to network topology service 80. Event database 75 comprises a plurality of observed events, while network topology database 95 maintains an updated network topology (network elements, connectivity, containment). Those skilled in the art will appreciate that each database may be co-located with its associated service on an internal data storage device, or it may be remotely located on an external data storage device.

Referring again to FIG. 3, the components of network correlation system 10 will be described in greater detail. Message parsing service 20 performs event (message) parsing, local event filtering and autoclear. It provides a standard tool for parsing messages generated by different network elements. In this case, message parsing service 20 receives raw messages from managed networks 55a–c via network mediation service 50 and event notification service 40. It then produces parsed messages which are routed to network management service 30 via event notification service 40. A suitable message parsing service is described in pending U.S. application Ser. No., 09/576,296, filed on May 23, 2000, and entitled Unified Message Parser Apparatus and System for a Real-Time Event Correlation now U.S. Pat. No. 6,732,153 which is assigned to the assignee of the present invention and incorporated herein by reference.

Network management service 30 performs a basic network management operation that generally provides a method of linking two or more communications networks in such a way that a seamless exchange of data is possible between the two networks. In the present case, network management service 30 provides network fault, configuration, performance, test, administration, and security management functions. It is coupled to one or more operator workstations 35a–c that allow network administrators or developers to edit message classes and monitor network correlation system 10.

The process of examining and validating the network traffic crossing the interface between an internal network and an external network is called mediation. Mediation is, therefore, a set of procedures and capabilities that act together to maintain both service, network, and physical element integrity. Here, network mediation service 50 provides connectivity to managed networks 55a–c, protocol conversion, data adaption, network alarm/fault detection, system performance, configuration management and test data collection. It is coupled to one or more managed networks 55a–c, each supplying raw message streams to network correlation system 10.

The central component of network correlation system 10 is event notification service 40. Event notification service 40 enables sophisticated communication of real-time events between multiple event clients and servers—the producers and consumers of events. It allows routing of messages and events to the connected service that subscribe to receive a particular type or level of event. Some features that event notification service 40 provide include asynchrony, event subscription, multicast event routing, event filtering, event offers, quality of service and structured events. As shown in FIG. 3, event notification service 40 communicates with the message parsing service 20, network management service 30, network mediation service 50, and event correlation services 60 via communication interfaces 100.

Figure 4:
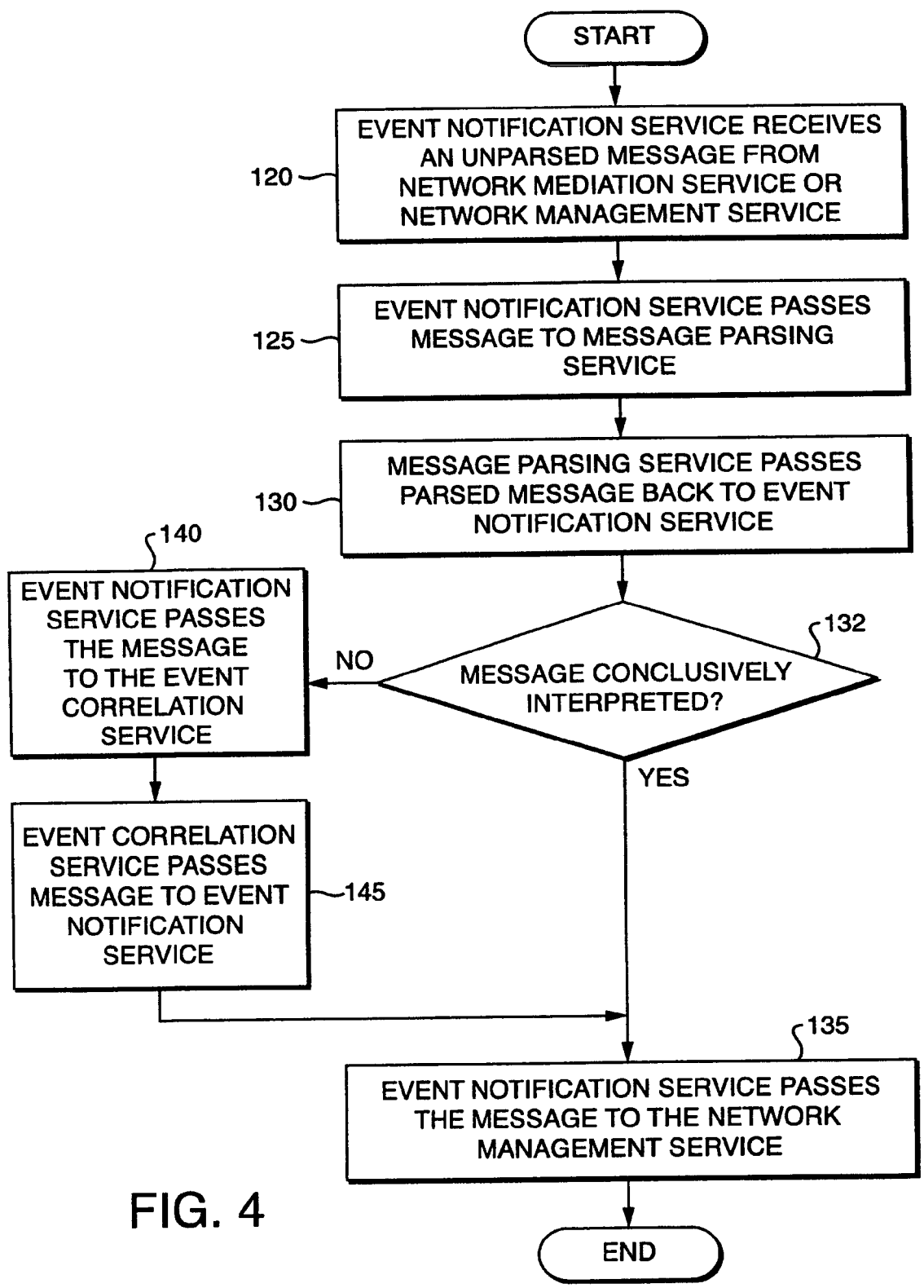
FIG. 4 is a flow diagram depicting the operation of the GRACE system in accordance with a preferred embodiment of the present invention.

Operation of the GRACE system will now be described in greater detail with reference to FIG. 4. As shown in FIG. 4, the process of event correlation begins in step 120 when the event notification service 40 receives an unparsed message from network mediation service 50 or network management service 30. Event notification service 40 then passes the unparsed message to message parsing service 20 for processing in step 125. In step 130, message parsing service passes a processed message back to event notification service 40 for further routing/processing. If the message is conclusively interpreted (step 132), it is passed to the network management service 30 for subsequent communication to a network operator (step 135). Otherwise, event notification service passes the message to the event correlation service 60 for further processing (step 140). After the event correlation service 60 processes the message, it is passed to event notification service 40 for routing (145). Processing then flows to step 135 and the event notification service passes the message to the network management service 30 for subsequent communication to a network operator.

Figure 5:
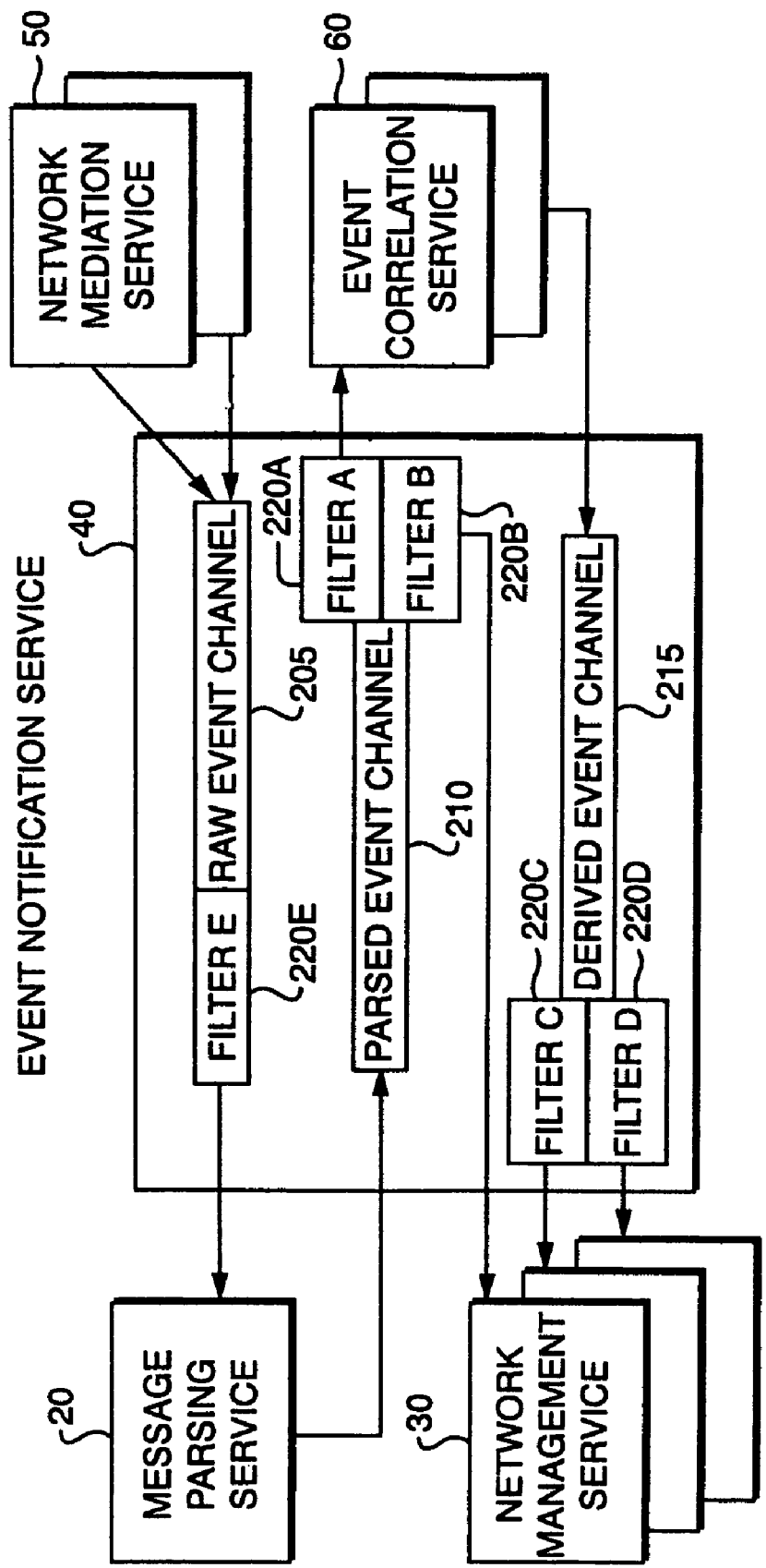
FIG. 5 is a more detailed diagram of an event notification service in accordance with a preferred embodiment of the present invention.

Referring now to FIG. 5, there is illustrated a more detailed diagram of event notification service 40. As shown, event notification service 40 is further comprised of three event channels: raw event channel 205, parsed event channel 210 and derived event channel 215. FIG. 5 also shows filters 220a–e. Filters 220a and 220b are coupled to parsed event channel 210, filters 220c and 220d are coupled to derived event channel 215, and filter 220e is coupled to raw event channel 205. Raw event channel 205 passes unparsed events from two threads of network mediation service 50 through filter 220e to message parsing service 20. Parsed event channel 210 passes parsed messages from message parsing service 20 through filter 220a to event correlation service 60. It also passes messages along a different thread through filter 220b to network management service 30. Messages passed to event correlation service 60 are passed to derived event channel 215 and then along two different threads through filter 220c and filter 220d to network management service 30. As shown in FIG. 5, it may be useful to chain together outputs of one channel to the inputs of another to create a notification chain. Each of the nodes or services in this chain may cache the event, ignore (filter) it, take action in response to the event, or perform a transformation of the event and forward it along the chain. Since the interaction between these chained services is decoupled, new services may be added and existing services may be easily replaced or updated. Also, it is easy to add supporting functions, such as event logging or validation by creating a new service and having it subscribe to a pre-existing channel.

Figure 6:
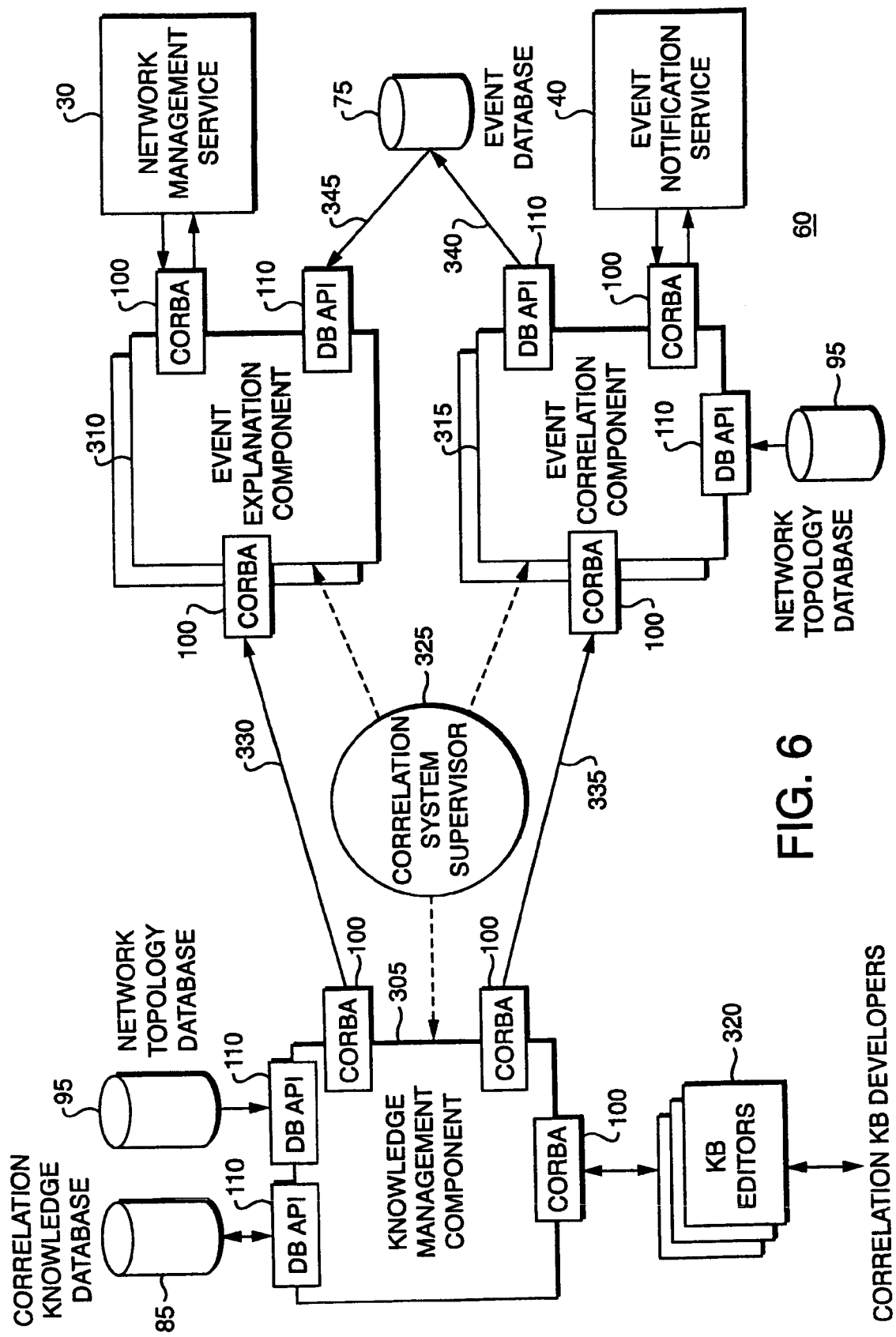
FIG. 6 is a more detailed diagram of an event correlation service in accordance with a preferred embodiment of the present invention.

FIG. 6 shows a more detailed diagram of event correlation system 60 in accordance with the present invention. In addition to the elements previously explained, event correlation system 60 is comprised of a knowledge management component 305, an event explanation component 310, an event correlation component 315, a correlation system supervisor 325 and a knowledge base editor 320. Knowledge management component 305 is coupled to event explanation component 310 via link 330. Link 330 transmits network topology data from network topology database 95 to event explanation component 310, and it passes correlation knowledge from correlation knowledge database 85 to event explanation component 310. Knowledge management component 305 is coupled to event correlation component 315 via link 335. As shown, link 335 transmits correlation knowledge from correlation knowledge database 85 to event correlation component 315. Knowledge management component 305 is additionally coupled to knowledge base editor 320, thereby providing an interface to knowledge management component 305 by correlation knowledge base developers.

FIG. 6 further shows that event database 75 is coupled to event correlation component 315 via link 340, and to event explanation component 310 via link 345. In operation, event correlation component 315 receives events from event notification service 40, compares the events to correlation knowledge received from knowledge management component 305, and then outputs correlated events to event notification service 40 for subsequent notification. Event correlation component 315 also identifies unfamiliar events by evaluating the events received from event notification service 40 in light of the correlation knowledge, and transmitting the unidentifiable events to event database 75 along link 340. Event explanation component 310 receives requests to explain unusual events from operator workstations 35a–c via network management service 30. Event explanation component 310 retrieves stored events from event database 75 and network topology and correlation knowledge data from knowledge management component 305 to provide explanations back to network management service 30. Like the services described in FIG. 3, these components communicate via the CORBA protocol. Correlation system supervisor 325 manages correlation system processes and creates appropriate channels in event notification service 40. When correlation system supervisor 325 receives a request to start a process, it either creates a new process or it accesses an existing process that is currently running a correlation engine with the appropriate attributes. As further shown in FIG. 6, correlation system supervisor 325 is logically linked to knowledge management component 305, event explanation component 310 and event correlation component 315. This allows the correlation system supervisor 325 to perform several functions including fault tolerance and load balancing for the various components. It also permits correlation system supervisor 325 to deactivate a process when it realizes that the process is no longer needed.

Figure 7:
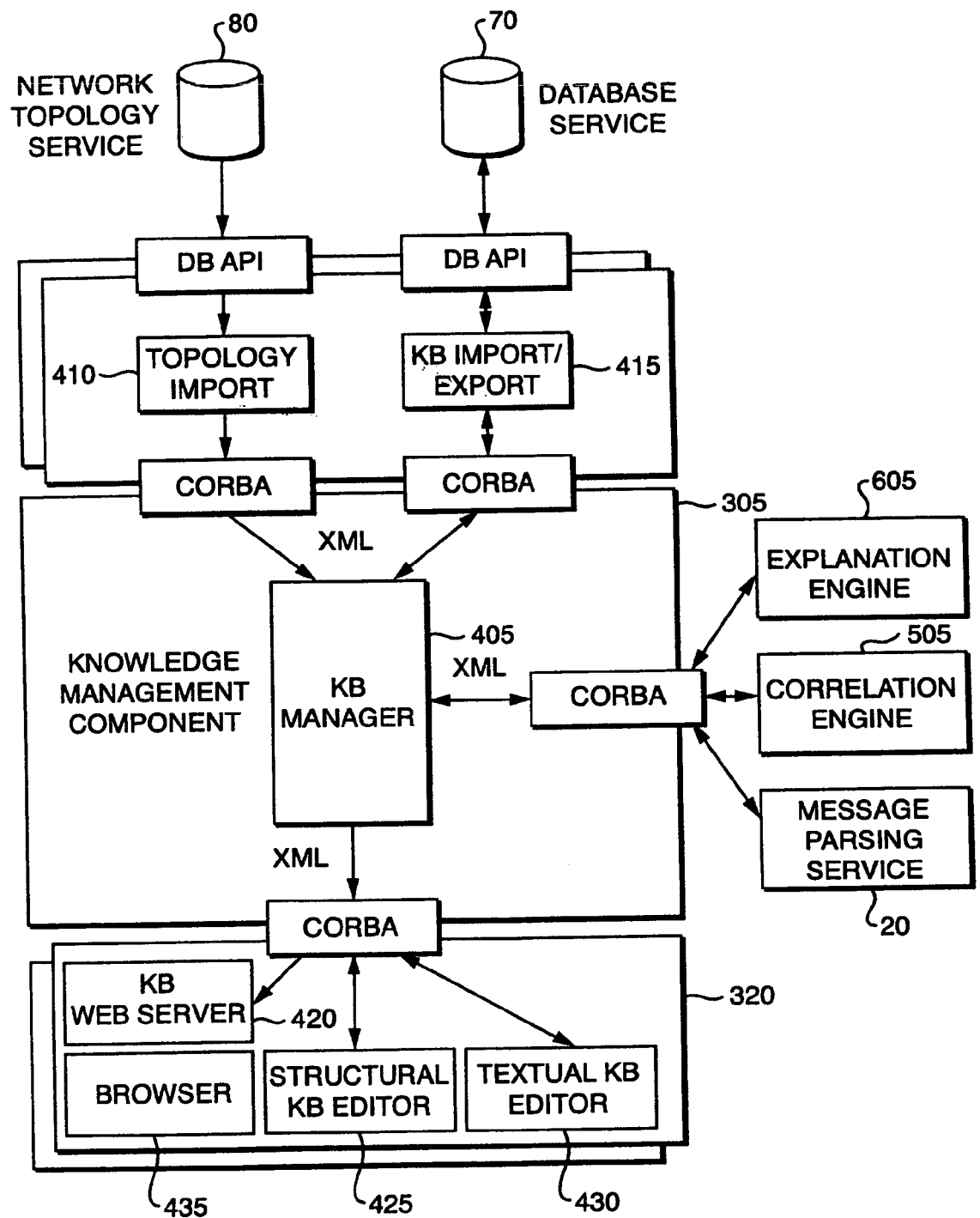
FIG. 7 is a more detailed diagram of a knowledge management component in accordance with a preferred embodiment of the present invention.

FIG. 7 shows a more detailed illustration of knowledge management component 305. As shown in FIG. 7, knowledge management component 305 is comprised of a knowledge base manager 405, a topology import module 410, and a knowledge base import/export module 415. FIG. 7 further shows that knowledge base editor 320 is comprised of a knowledge base web server 420, a structural (GUI) knowledge base editor 425, a textual knowledge base editor 430, and a browser 435. Knowledge base manager 405 serves and verifies the correlation knowledge database 85 (via database service 70) and controls access to the database. It is responsible for performing the following tasks: (1) working as a broker between clients (editors, browsers, and engines) and servers (knowledge and topology databases); (2) making translations between XML and data representation formats used in the knowledge and the topology databases; (3) validating the syntactic and semantic correctness of knowledge entities to be entered into the knowledge database; and (4) administering the knowledge database. Topology import module 410 provides interactive access to network topology database 95 via the network topology service 80. Knowledge base import/export module 415 provides interactive access to the correlation knowledge base database 85 via the database service 70. Knowledge base Web server 420 allows querying and reporting about network correlation system 10 via browser 435. A structural knowledge base editor 425 is a graphical tool for editing network correlation system 10 knowledge while maintaining consistency and correctness. Textual knowledge base editor 430 is a textual tool for editing network correlation system 10 knowledge. Both types of editors allow network correlation system 10 application developers to create, modify, view, and report all components of the correlation knowledge database 85 including: rules, correlations, rule sets, message classes, network element classes, and FSMs.

Figure 8:
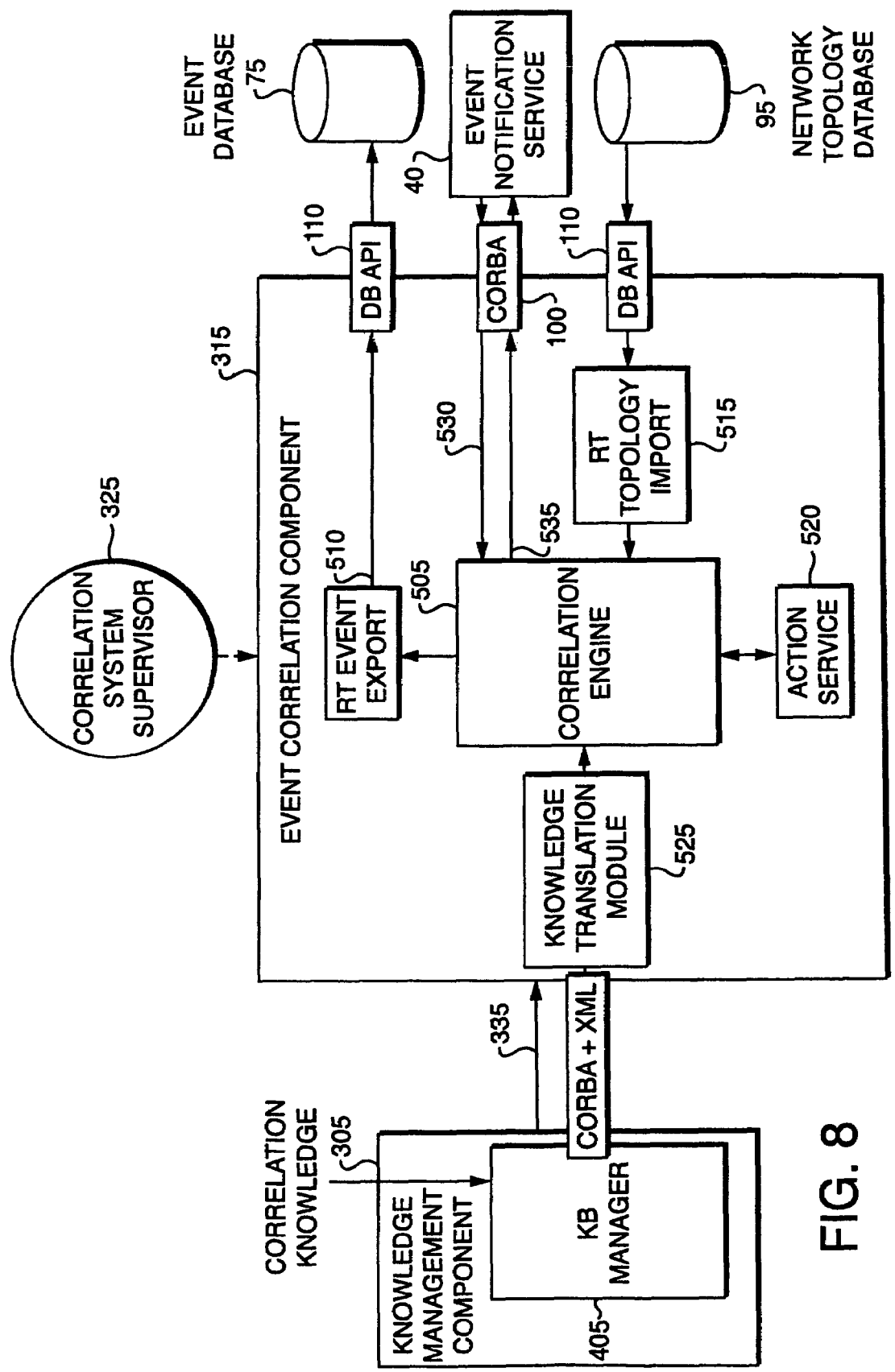
FIG. 8 is a more detailed diagram of an event correlation component in accordance with a preferred embodiment of the present invention.

Event correlation component 315, as shown in FIG. 8, is further comprised of a correlation engine 505, a real-time event export module 510, a real-time topology import module 515, an action service 520 and a knowledge translation module 525. Correlation engine 505 is coupled to event notification service 40 via input link 530 and output link 535. Correlation engine 505 is responsible for accepting incoming events from event notification service 40, interpreting the events, and passing the derived (correlated) events back to event notification service 40. To proceed with the correlation process, the correlation engine gets required correlation knowledge from knowledge management component 305. CosNotification events input into correlation engine 505 include: (1) parsed event objects; (2) results from tests, database queries or other external actions; and (3) correlation events generated by other correlation engine 505 processes. Events output from correlation engine 505 include: (1) requests to other services to take actions or fetch data; (2) messages that should be added to event lists; (3) messages that should be removed or modified on event lists; (4) input to other correlation engine processes; and (5) status information which may be logged or ignored. Correlation system supervisor 325 provides correlation engine 505 with the proper channels to read from/write to, and the proper knowledge base 85 to utilize for interpreting the inputted events. Multiple correlation engine 505 processes may be run to support different sets of input channels, output channels or knowledge bases. Real-time event export module 510 caches correlation engine 505 state data (raw and derived events, state changes, etc.) and passes the data to event database 75 for use by the explanation engine 805 (described below). Real-time topology import module 515 provides real-time access to network topology database 95 by correlation engine 505. Knowledge translation module 525 translates rules, correlations and FSMs from XML to the object-oriented language of correlation engine 505.

Figure 9:
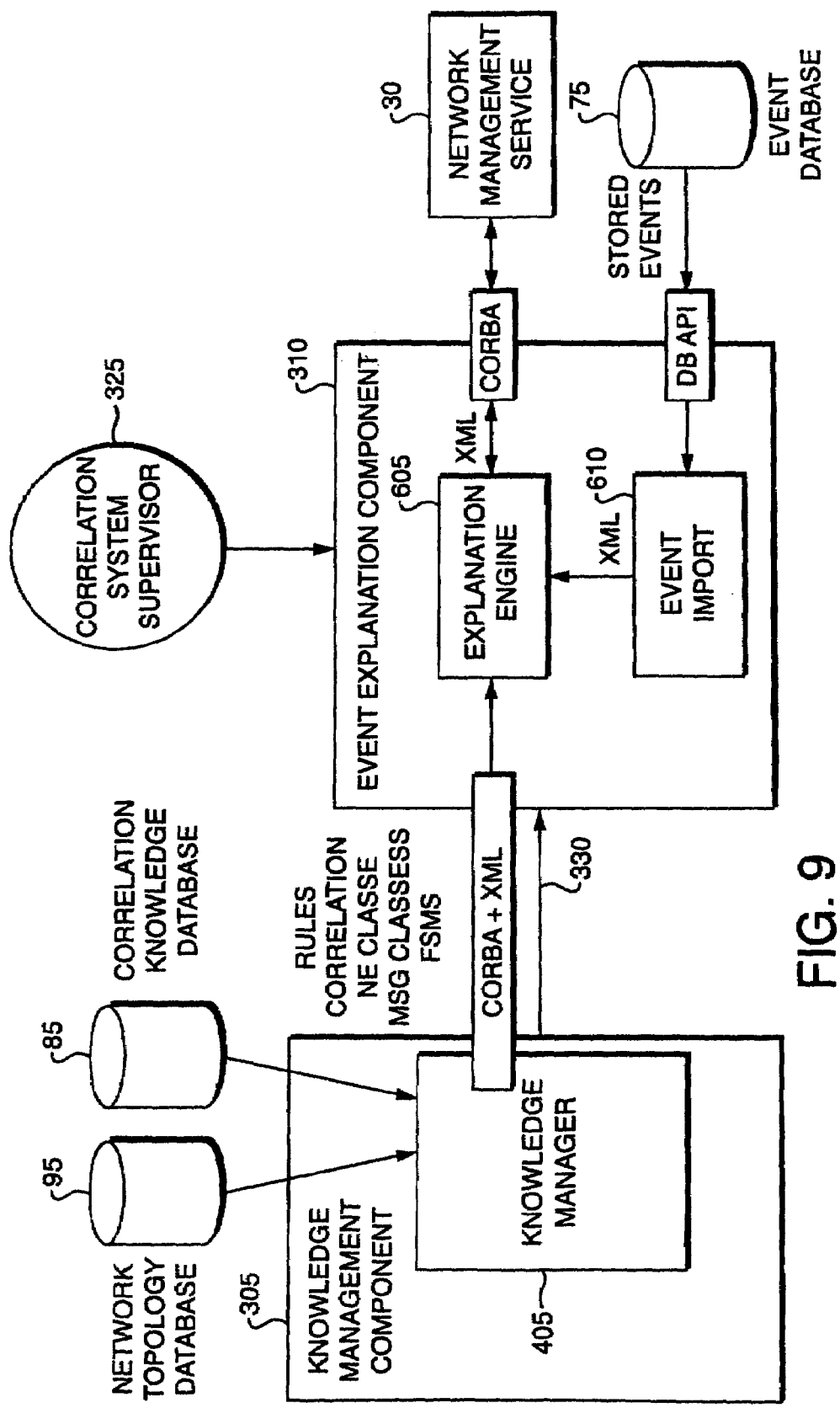
FIG. 9 is a more detailed diagram of an event explanation component in accordance with a preferred embodiment of the present invention.

Referring now to FIG. 9, there is illustrated a more detailed illustration of event explanation component 310. As shown, event explanation component 310 is further comprised of explanation engine 605 and event import module 610. In operation, event explanation engine 605 analyzes conclusions or situations recognized by correlation engine 505 (FIG. 8). That is, after correlation engine 505 processes a parsed event, the derived event may be transmitted to network management service 30 and then on to explanation engine 605. Once explanation engine 605 receives an event, it may: (1) find events subsumed by a selected one; (2) find independent alarms; (3) perform detailed analysis of the cause of an alarm; (4) display a causal tree of a derived event; (5) display derived events caused by a given event; (6) display the rule, correlation, message, network, or FSM that is related to a derived alarm; (7) display advisory text associated with derived alarms; or (8) find other parts of the network that might be affected by a given fault. recognizes that an event or series of events. In performing its functions, explanation engine 605 accesses knowledge base manager 405 and topology service 80 via link 330, message parsing service 20 and event logs. Event import module 610 provides interactive access to event database 75 by explanation engine 605.

This description thus far has addressed the utility of the preferred embodiment network correlation system 10 with respect to the network operations personnel. However, as stated earlier, many different applications of this technology can be implemented without departing from the scope and intent of this disclosure. For example, FIG. 10 shows a graphical depiction of the various applications (e.g., health care 730, financial services 720 and telecommunications 710) and personnel (health care professionals 760, financial analysts 750 and network operations personnel 740) who can benefit from the use of a network correlation in accordance with the preferred embodiment of the present invention. In addition to the previously specified users/applications, FIG. 10 also shows that other, unspecified client systems can also be supported. In use, telecommunications information 710 is inputted into the subject network correlation system, and data is outputted to the intended network operations personnel. As stated earlier, different applications and users can simultaneously access the preferred embodiment of the network correlation system 10, since it is imagined that each user would simply access a different thread of the network correlation system 10, independent of the other users. For example, financial analyst 750, operating workstation 35*a* could retrieve and correlate financial data from managed network 55*b*, through network mediation service 50*a*, event notification service 40 and network management service 30*a*. Health care professional 760, located at 5 operator workstation 35*b*, could retrieve/correlate medical data from managed network 55*b* (which may include data directly from an ambulatory patient).

From the foregoing description, it will be appreciated that the present invention provides an efficient system and method for the use of knowledge-based systems for performing event correlation and message notification in a computer system. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

The method of the present invention may conveniently be implemented in program modules that are based upon the flow chart in FIG. 4. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

What is claimed is:

1. A data processing apparatus for correlating network events among a number of client services comprising:
   at least one computer comprising:
      a memory having program instructions; and
      a processor configured to use said program instructions to provide:
         a network management service;
         an event notification service;
         a network mediation service adapted to:
            receive a raw event from an external computer network; and
            transmit said raw event to said event notification service;
         a message parsing service adapted to:
            receive a raw event from said event notification service;
            parse said raw event; and
            transmit said parsed event to said event notification service; and
         an event correlation service coupled to a knowledge database comprising correlation knowledge, said event correlation service adapted to:
            receive said parsed event from said event notification service;
            utilize data stored in said knowledge database to derive an event from said parsed event; and
            transmit said derived event to one of a plurality of operator workstations via said event notification service, regardless of a significance of said derived event;
   wherein said network mediation, message parsing, event notification and network management services are coupled together via a plurality of interfaces.

2. The data processing apparatus of claim 1, wherein said network mediation service is adapted to interface with at least one external computer network.

3. The data processing apparatus of claim 2, wherein said network mediation service is further adapted to:
   receive a raw event at said network mediation service from said external computer network; and
   transmit said raw event to said message parsing service.

4. The data processing apparatus of claim 1, wherein said message parsing service is adapted to receive a raw event from said network mediation service and produce a parsed event.

5. The data processing apparatus of claim 4, wherein said message parsing service is adapted to route said parsed event to said network management service via said event notification service.

6. The data processing apparatus of claim 5, wherein said message parsing service is adapted to route said parsed event to said event correlation service via said event notification service.

7. The data processing apparatus of claim 1, wherein said network management service is adapted to interface with a plurality of operator workstations.

8. The data processing apparatus of claim 1, wherein said network management service is further adapted to:
   receive data requests from said plurality of operator workstations; and
   transmit said data requests to said event correlation service via said event notification service.

9. The data processing apparatus of claim 4, wherein said event notification service is further comprised of:
   a raw event channel;
   a parsed event channel; and
   a derived event channel.

10. The data processing apparatus of claim 9, wherein said event notification service is further comprised of at least one filter.

11. The data processing apparatus of claim 10, wherein said at least one filter is coupled to at least one of said plurality of event channels.

12. The data processing apparatus of claim 9, wherein said raw event channel is adapted to:
   receive a raw event from said network mediation service; and
   transmit said raw event to said message parsing service.

13. The data processing apparatus of claim 9, wherein said parsed event channel is adapted to:
   receive a parsed message from said message parsing service; and
   transmit said parsed message to said network management service.

14. The data processing apparatus of claim 9, wherein said parsed event channel is adapted to:
   receive a parsed event from said message parsing service; and
   transmit said parsed event to said event correlation service.

15. The data processing apparatus of claim 9, wherein said derived event channel is adapted to:
   receive a derived event from said event correlation service; and
   transmit said derived event to network management service.

* * * * *